United States Patent [19]

Yau

[11] Patent Number: 5,487,360

[45] Date of Patent: Jan. 30, 1996

[54] PERCHING ROD FOR BIRD CAGE

[76] Inventor: Yeong J. Yau, P.O. Box 1750, Taichung, Taiwan

[21] Appl. No.: 266,475

[22] Filed: Jun. 27, 1994

[51] Int. Cl.$^6$ .................................................. A01K 31/12
[52] U.S. Cl. .................................................. 119/26
[58] Field of Search ............................ 119/24, 25, 26; 24/300, 301, 302, 298, 122.6

[56] References Cited

U.S. PATENT DOCUMENTS

| | | | |
|---|---|---|---|
| 5,228,411 | 7/1993 | O'Rourke | 119/26 |
| 5,315,957 | 5/1994 | Garay et al. | 119/26 |
| 5,351,647 | 10/1994 | Frenelle | 119/26 |

Primary Examiner—Todd E. Manahan

[57] ABSTRACT

A perch of the bird cage comprises a perching rod, two retaining members, and two fastening nuts. Each of the two retaining members has one end that is fastened to the perching rod and another end that is provided with a predetermined number of male threads and is further provided axially with a cruciform slot, which is engageable with an upright rod, a horizontal rod of the bird cage, or the junction of the upright rod and the horizontal rod. Each of the two fastening nuts is provided with a predetermined number of female threads engageable with the male threads of the retaining members.

1 Claim, 5 Drawing Sheets

PERCHING ROD FOR BIRD CAGE

FIELD OF THE INVENTION

The present invention relates generally to a perching rod of the bird cage, and more particularly to a perching rod locating joint of the bird cage.

BACKGROUND OF THE INVENTION

As shown in FIG. 1, a conventional bird cage 10 is generally provided with a perching rod 11, upon which a bird rests. The perching rod 11 is fastened at both ends thereof to the cage by means of cords or wires. Such s conventional method of fastening the perching rod 11 as described above is defective in design in that it is rather time-consuming to fasten the perching rod 11 by means of cords or wires, and that the perching rod 11 can not be fastened securely to the bird cage by means of cords or wires, and further that the perching rod 11 can not be relocated easily and conveniently.

SUMMARY OF THE INVENTION

It is therefore the primary objective of the present invention to provide a bird cage with a perching rod locating joint of simple construction, which enables the perching rod to be fastened securely and quickly to the bird cage.

It is another objective of the present invention to provide a perching rod locating joint enabling the perching rod to be fastened easily from the outside of a bird cage.

It is still another objective of the present invention to provide a perching rod locating joint, which enables the perching rod to be relocated easily.

The foregoing objectives of the present invention are attained by a perching rod locating joint, which comprises a perching rod, two retaining members, and two fastening nuts. The two retaining members are fastened respectively at one end thereof to both ends of the perching rod. Each of the two retaining members has another end provided with a predetermined number of male threads and with a cruciform slot of a predetermined depth. The cruciform slot is engageable with an upright rod, a horizontal rod, or a junction of the upright rod and the horizontal rod. Each of the two fastening nuts is provided with a predetermined number of female threads engageable with the male threads of the retaining member.

The foregoing objectives, features and advantages of the present invention will be more readily understood upon a thoughtful deliberation of the following detailed description of the present invention in conjunction with the accompanying drawings.

DETAILED DESCRIPTION OF THE INVENTION

Figure 1:
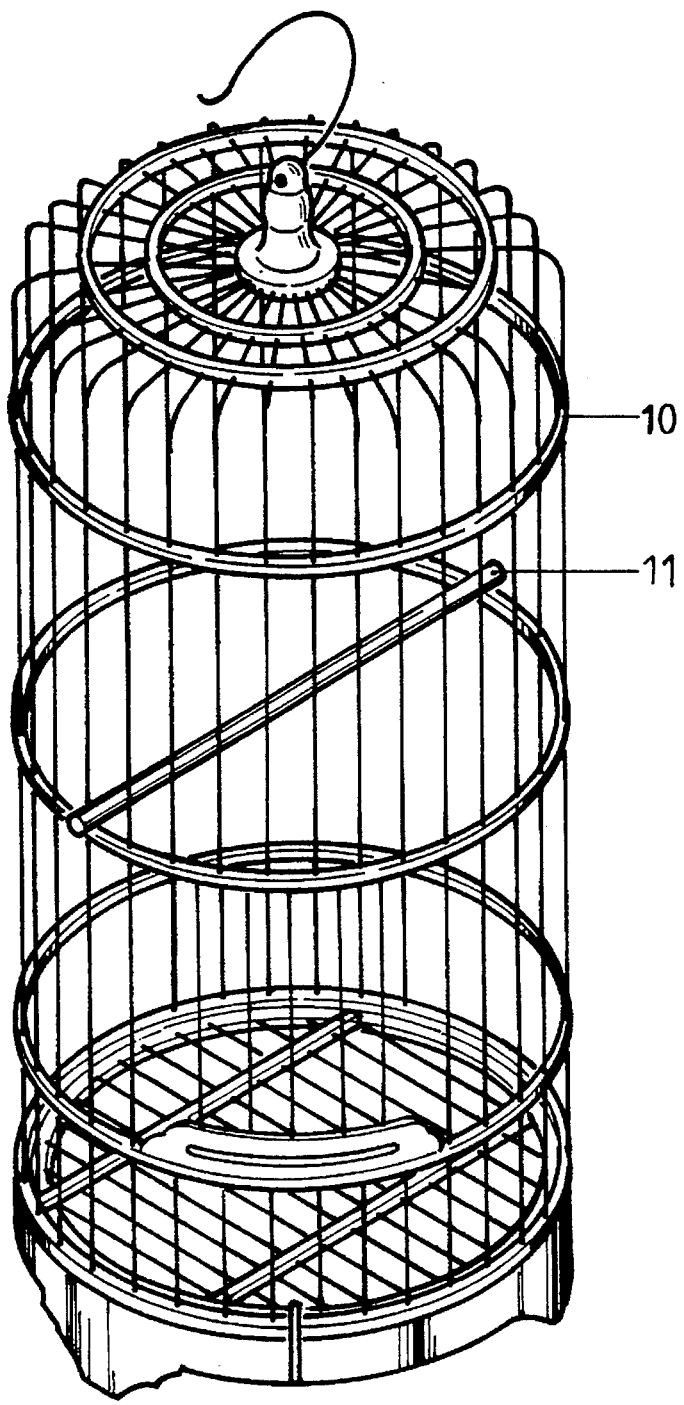
FIG. 1 shows a perspective view of a bird cage of the prior art.
Figure 2:
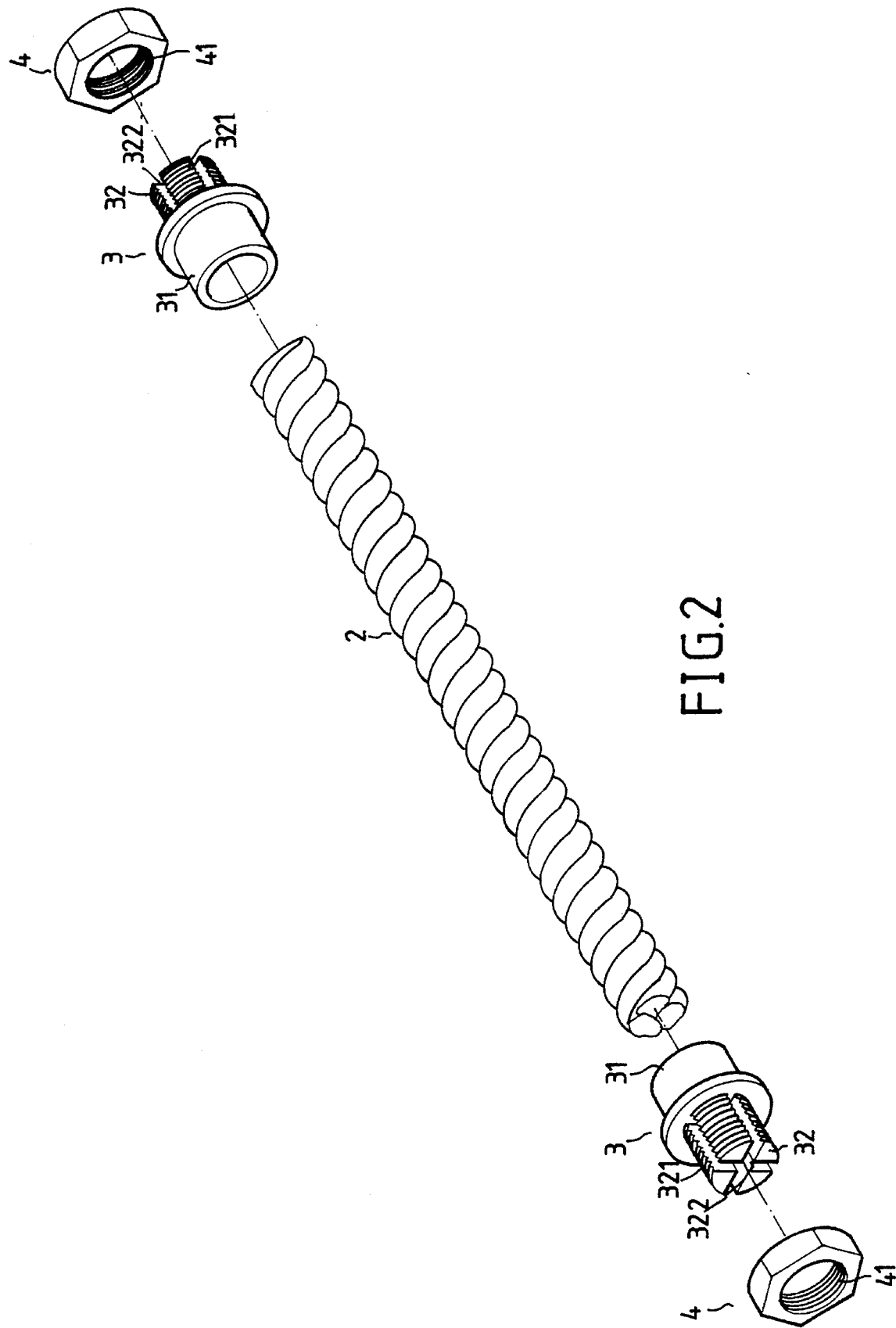
FIG. 2 shows an exploded view of the present invention.
Figure 3:
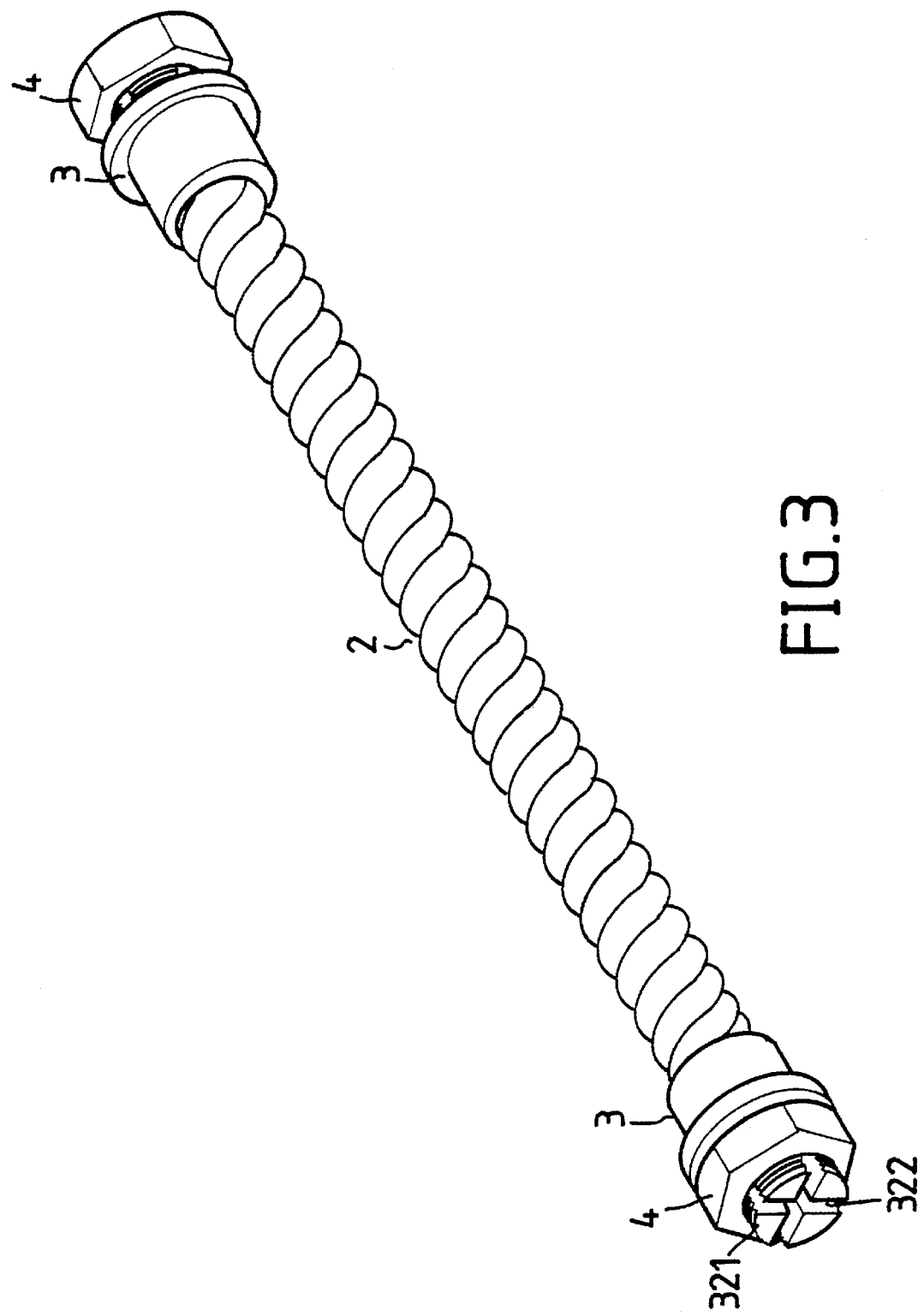
FIG. 3 shows a perspective view of the present invention in combination.
Figure 4:
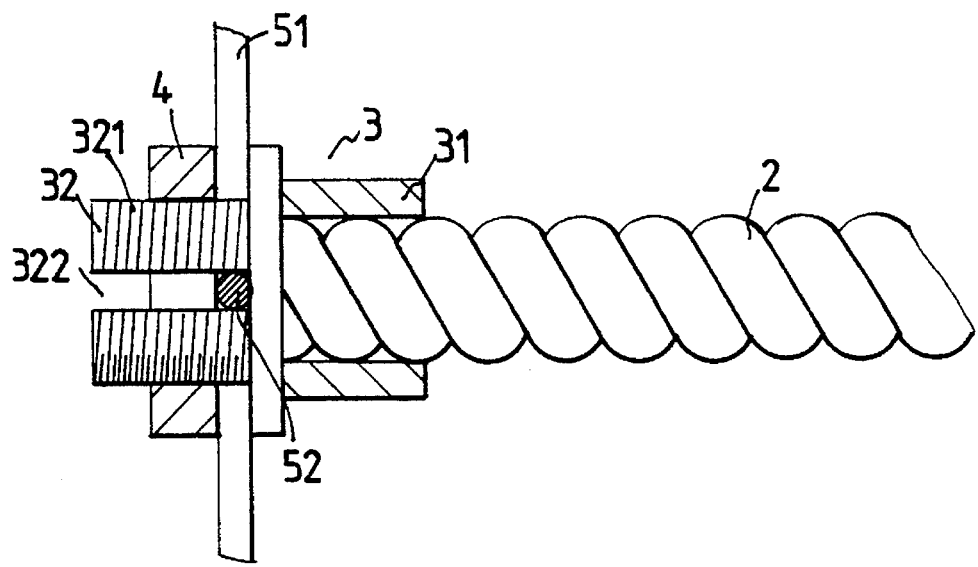
FIG. 4 shows a sectional view of the present invention

As shown in FIGS. 2, 3 and 4, the present invention comprises a perching rod 2, two retaining members 3, and two fastening nuts 4.

The perching rod 2 is provided as a roost for birds.

The retaining members 3 are made of a plastic material by injection molding and provided respectively with one end 31 which is fastened to the perching rod 2, and with another end 32 having a predetermined number of male threads 321 and a cruciform slot 322 of a predetermined depth. The retaining members 3 are fastened to the upright rod 51, the horizontal rod 52 of the bird cage (not shown in the drawing) or the junction of the upright rod 51 and the horizontal rod 52 by means of the cruciform slot 322 which is disposed axially and provided on the surface of the bottom thereof with anti-skidding threads 333 for preventing the upright rod 51 and the horizontal rod 52 from sliding in the cruciform slot 322 of the retaining member 3.

The fastening nuts 4 are made of a plastic material by injection molding and provided respectively with a predetermined number of female threads 41 engageable with the male threads 321 of the retaining member 3 for holding securely the upright rod 51 and the horizontal rod 82 of the bird cage in the cruciform slots 322 of the retaining members 3.

Figure 5:
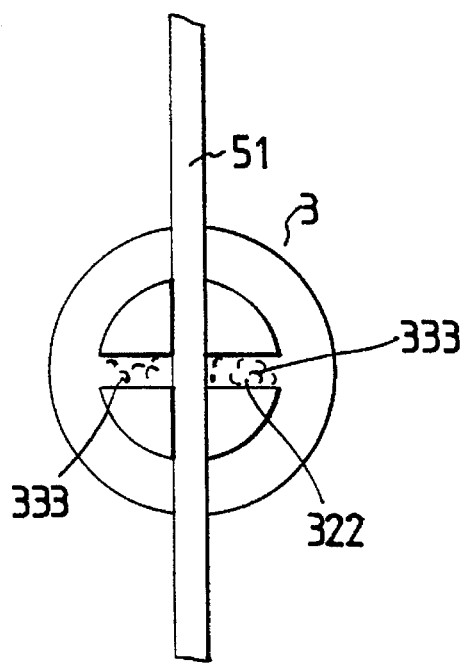
FIG. 5 shows a side elevational view of the present invention in which the retaining members and the upright rod of the cage are fastened together.
Figure 6:
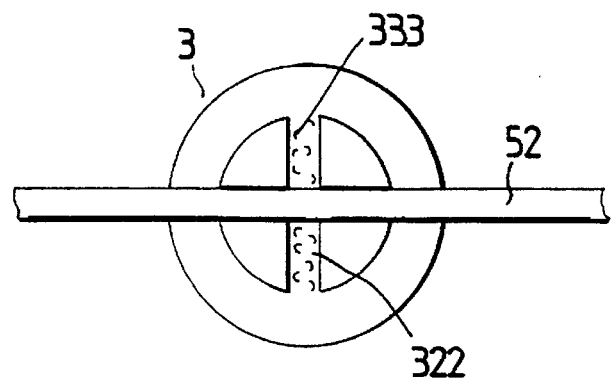
FIG. 6 is a side elevational view showing that the retaining members and the horizontal rod of the present invention are fastened together.
Figure 7:
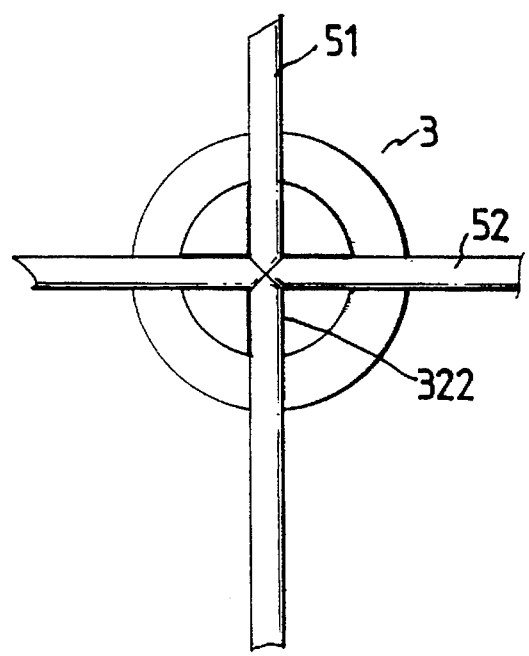
FIG. 7 is a side elevational view showing that the retaining members of the present invention are fastened simultaneously with the upright rod and the horizontal rod of the bird cage.

As shown in FIGS. 2–7, the perching rod 2 is provided with the retaining members 3 fastened thereto. The perching rod 2 is located in the bird cage by allowing the cruciform slots 322 of the retaining members 3 to engage any upright rod 51 (as shown in FIG. 5) or any horizontal rod 52 (as shown in FIG. 6) or the junction of the upright rod 51 and the horizontal rod 52 (as shown in FIG. 7). Thereafter, allow the female threads 41 of one fastening nut 4 to engage the male threads 321 of the retaining member 3 so as to locate securely the perching rod 2. The work of locating the perching rod 2 can be done easily from the outside of the bird cage. In addition, the perching rod 2 can be relocated easily.

The embodiment of the present invention described above is to be regarded in all respects as merely illustrative and not restrictive. Accordingly, the present invention may be embodied in other specific forms without deviating from the spirit thereof. The present invention is therefore to be limited only by the scope of the following appended claims.

What is claimed is:

1. A perching rod for a bird cage comprising:

a perching rod body for disposing in said bird cage, said perching rod including two ends;

two retaining members each including a first end fastened to said ends of said perching rod and including a second end having an outer thread formed thereon, said second ends of said retaining members each including a cruciform slot formed therein and having a predetermined depth for retaining therein an upright rod, a horizontal rod or a junction of said upright rod and said horizontal rod of said bird cage, said cruciform slots of said retaining members each including a bottom surface having an anti-skidding surface formed thereon for preventing sliding movement of said upright rod and said horizontal rod in said cruciform slots; and two fastening nuts having an inner thread formed therein for engaging with said outer thread of said retaining member and for securing said perching rod body to said upright rod and said horizontal rod.

* * * * *